April 21, 1964

L. F. TAYLOR 3,129,523

ELECTRIC IRONS

Filed Aug. 24, 1962

INVENTOR.
Lloyd F. Taylor
BY
Johnson and Kline
ATTORNEYS

April 21, 1964  L. F. TAYLOR  3,129,523
ELECTRIC IRONS
Filed Aug. 24, 1962  2 Sheets-Sheet 2
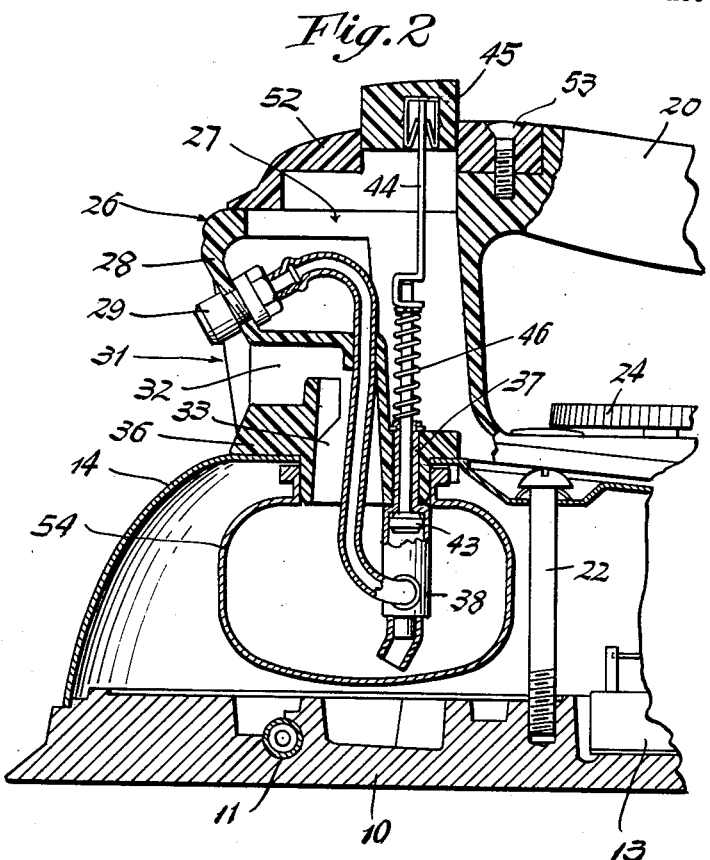
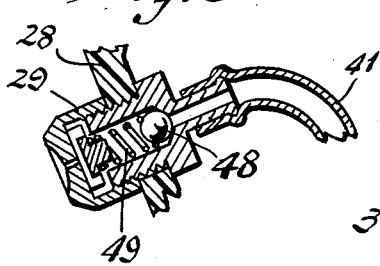
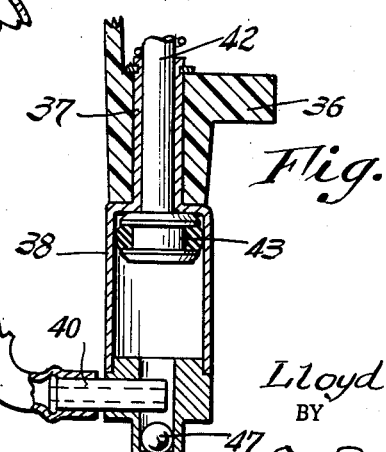
INVENTOR.
Lloyd F. Taylor
BY
Johnson and Kline
ATTORNEYS

United States Patent Office 3,129,523
Patented Apr. 21, 1964

3,129,523
ELECTRIC IRONS
Lloyd F. Taylor, Fairfield, Conn., assignor, by mesne assignments, to Scovill Manufacturing Company, Waterbury, Conn., a corporation of Connecticut
Filed Aug. 24, 1962, Ser. No. 219,275
2 Claims. (Cl. 38—78)

This invention relates to electric irons, and more particularly to irons of the type which are provided with means for spraying with water or other liquid the material to be ironed directly in the path of the advancing iron.

An object of this invention is to provide an electric iron of the type referred to in which the various parts are comparatively simple and easily assembled and yet perform their functions efficiently.

Such electric irons have a soleplate which is electrically heated, a casing over the soleplate and a superstructure having a handle portion by means of which the iron is lifted and manipulated. Usually, such irons have a reservoir for storing for use a quantity of liquid, a spray nozzle and manually operable pump means for forcing the water or other liquid from the reservoir to the spray nozzle when the material to be ironed requires spraying.

According to the present invention, the reservoir is supported in the casing out of good heat-conducting relation with the soleplate and the casing so as to avoid excessive heating of the water and resultant generation of steam.

The superstructure is mounted on the casing and comprises a handle section and a forward section, the latter, according to the present invention, carrying a forwardly and downwardly directed spray nozzle and a manually operable pump which projects into the reservoir and which is connected to the spray nozzle by a tube so that water in the reservoir may be expelled as a spray just ahead of the toe of the iron. The forward section also has a passage open at the front of the iron leading to the reservoir through which replacement water may pass into the reservoir.

According to the present invention, the forward section of the superstructure may conveniently have the nozzle, pump and piston therefor, and the conduit connecting the pump with the nozzle assembled and tested as a unit before the superstructure is assembled on the casing of the iron. To facilitate the assembling of such parts on the forward section, the latter is made open at the top and a cover section is provided which may be secured in place after the handle section has been assembled and either before or after the superstructure is secured to the casing.

Other features and advantages will hereinafter appear.

In the accompanying drawings—

FIG. 2 is a sectional view of the forward part of an electric iron having a modified form of water reservoir.

FIG. 3 is a sectional view showing the top portion of the conduit which extends between the nozzle and the pump and the nozzle in cross section.

FIG. 4 is a sectional view showing part of the forward section of the superstructure, a pump cylinder and piston, and the outlet from the cylinder and a portion of the conduit leading to the spray nozzle.

Figure 1:
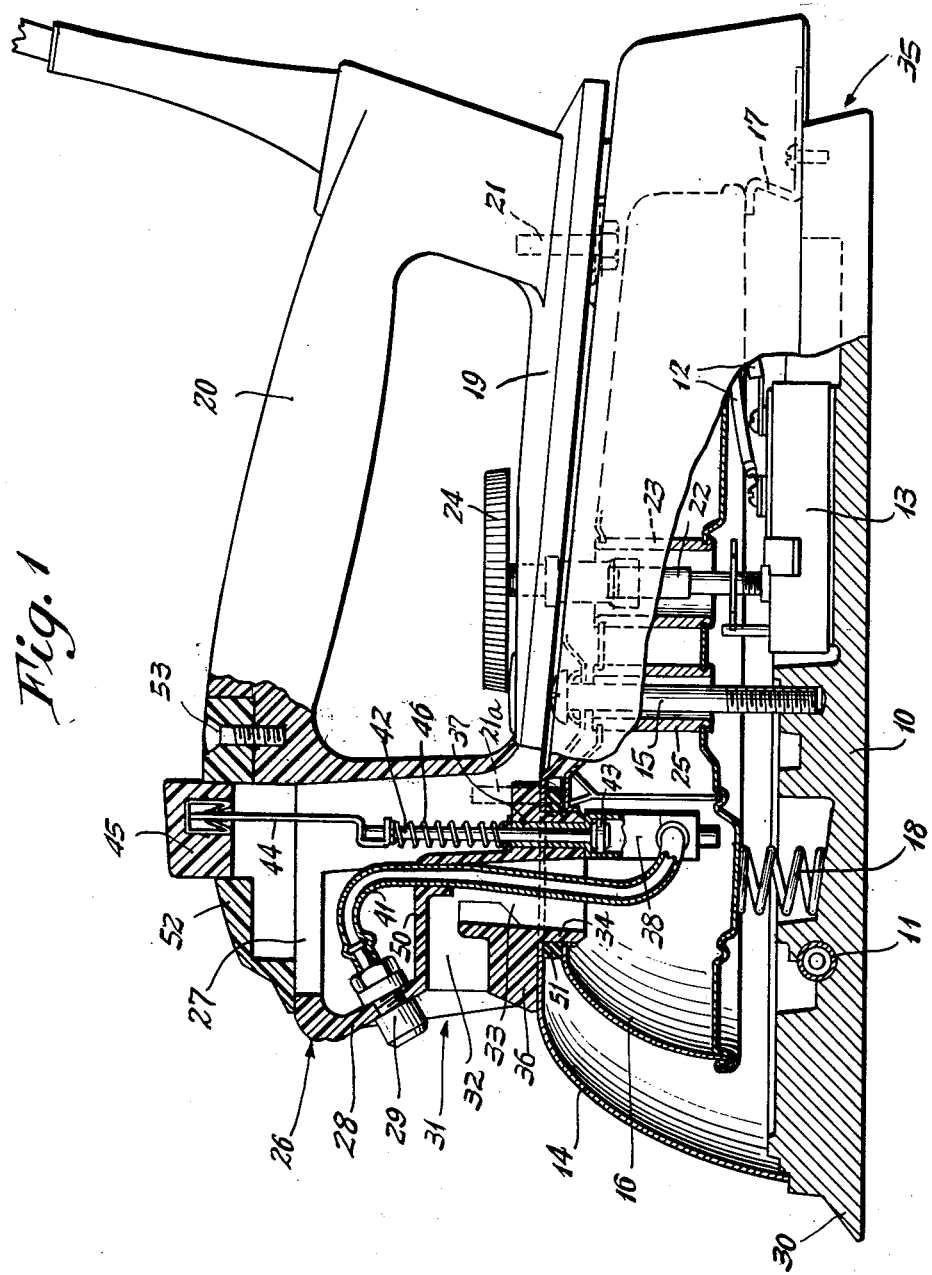
FIGURE 1 is a side elevation of an electric iron of the type referred to above with the forward portion broken away to show the parts in section.

As shown in the accompanying drawings, the iron to which the present invention is applied comprises a soleplate 10 having an armored heating element 11 embedded therein supplied by current from conductors 12 under the control of a thermostat 13 carried by the soleplate.

Supported on the soleplate 10 is a casing 14 which extends over the soleplate and is secured thereto by a screw 15 threaded in the soleplate. Within the casing there is located, as shown in FIG. 1, a reservoir 16 for holding a supply of water or other fluid and this is supported on the soleplate by a bracket 17 at the heel of the soleplate and a coil spring 18 near the forward end of the soleplate. The bottom of the reservoir 16 is spaced from the soleplate and the top is spaced from the casing so that the reservoir does not have good heat-conducting relation with either the soleplate or the casing.

Surmounting the top of the casing is a superstructure 19 comprising a handle portion 20 by means of which the iron can be lifted and manipulated, the superstructure being secured to the casing by bolts, such as the bolt 21 and screws 21a shown in dotted lines in FIG. 1.

The thermostatic switch 13 is operated by a shaft 22 which extends up through a tubular spacer 23 in the reservoir, an aperture in the casing and an aperture in the superstructure 19 where it is provided with a knob or finger piece 24 which may be rotated to adjust the setting of the thermostat. The reservoir has another tubular spacer 25 through which the screw 15 extends.

The superstructure is preferably made in the form of a molded plastic piece including the handle portion 20 and a forward section 26 which is molded to have an open top 27 and a forward wall 28 for receiving and holding the spray nozzle 29 which is directed downwardly and forwardly toward an area immediately in front of the toe 30 of the iron. The forward section 26 has an opening 31 leading to a horizontal passage 32 and a vertical passage 33 and at its lower end terminates in a circular collar 34 which projects through an aperture in the casing 14 and an aperture in the reservoir 16. By tipping the iron up on its heel 35, water may be poured into the opening 31 and through the passages 32 and 33 into the reservoir to supply the latter with water.

The lower enlarged portion 36 of the forward section 26 rests on the top surface of the casing 14 and rearward of the passage 33 has a hole supporting the neck 37 of a pump cylinder 38 which extends down into the reservoir and, as shown in FIG. 4, has an orifice 39 at its lower end near the bottom of the reservoir through which water may enter into the pump cylinder. The pump cylinder also has a tube 40 to which is connected a tube 41 leading to the spray nozzle 29 shown in detail in FIG. 3. Slidably mounted in the neck of the pump cylinder is a piston rod 42 for a piston 43, the upward movement of which is limited by the upper end of the cylinder 38. The upper end of the piston rod 42 is connected to a link 44 having at its upper end a finger piece 45.

By applying manual pressure to the finger piece 45, the piston is caused to descend in the cylinder against the tension of a spring 46 and force water from the cylinder through the tube 40 and tube 41 to the spray nozzle, the orifice 39 in the bottom of the cylinder being closed by a check valve 47 in the form of a ball seated over the orifice. By removing finger pressure from the finger piece 45, the piston is caused to return to its upper position allowing water to again enter the cylinder. The return of water from the spray nozzle and the tube 41 is prevented by a check valve 48 operating under the influence of a spring 49.

The tube 41 leading to the spray nozzle passes upwardly from the lower end of the pump cylinder through the passage 33 and through a hole in a horizontal wall 50 in the forward section 26 and is held in position by the wall. The tube 41 is preferably flexible and may be made of suitable plastic material. At its forward end the reservoir 16 is held spaced from the top of the casing 14 by a resilient washer 51.

Since the top of the forward section 26 is open, it will readily be seen that the nozzle 29 can be assembled in position with great ease, that the pump cylinder with the piston and piston rod contained therein can be assembled by being passed upwardly through the aperture in the enlarged portion 36, and that the tube 41 can easily be attached to the lower end of the pump and the receiving end of the spray nozzle, being passed upwardly through the hole in the wall 50, before the superstructure is attached to the casing. After this has been done, the open top of the forward section 26 is closed by a cover plate 52 secured to the handle section by a screw 53 and which has an aperture to guide the movements of the finger piece 45.

In the modification of the invention illustrated in FIG. 2, the reservoir is in the form of a bulbous tank 54 and occupies only the forward portion of the iron.

Variations and modifications may be made within the scope of the claims and portions of the improvements may be used without others.

I claim:

1. An electric iron comprising a soleplate; a hollow casing secured to the soleplate; a water reservoir suspended in the casing substantially out of good heat-conducting relation with the soleplate and the casing; a superstructure secured to the casing and having a handle section and a forward section, the latter having a neck extending through aligned apertures in the casing and the reservoir into the reservoir, and an enlarged portion seating on the casing, the forward section having a passage open at the front of the iron and extending into the reservoir to receive and guide water to the reservoir; a vertically disposed pump cylinder carried by said forward section, extending into the reservoir, and having adjacent the bottom thereof an intake opening provided with a check valve and a delivery opening; a forwardly and downwardly directed spray nozzle carried by an external wall of said forward section; a conduit connecting said delivery opening in the pump cylinder with said spray nozzle; a vertically movable piston in said cylinder; and means for operating said piston comprising a finger piece slidably mounted in said superstructure, means for connecting the finger piece with the piston for movement in one direction, and a spring for moving the piston in return direction, the forward section having an opening at the top whereby the nozzle, conduit, pump cylinder and piston may be conveniently assembled on the forward section which may then be mounted as a unit on the casing, and a cover plate secured to the handle section for closing the open top of said forward section.

2. An electric iron as defined in claim 1, having means for securing the assembled forward section and casing as a unit on the soleplate.

References Cited in the file of this patent

UNITED STATES PATENTS

| | | |
|---|---|---|
| 2,180,523 | Horton | Nov. 21, 1939 |
| 2,674,054 | Maykemper | Apr. 6, 1954 |
| 2,770,896 | Holmberg | Nov. 20, 1956 |
| 2,817,169 | Schott | Dec. 24, 1957 |
| 2,832,160 | Beach | Apr. 29, 1958 |
| 3,001,305 | Sardeson | Sept. 26, 1961 |